US012669224B1

(12) United States Patent
Liu

(10) Patent No.: US 12,669,224 B1
(45) Date of Patent: Jun. 30, 2026

(54) SOLAR CAMPING LAMP

(71) Applicant: Guangdong Bravo New Energy Technology Co. LTD., Shunde (CN)

(72) Inventor: Ziang Liu, Shunde (CN)

(73) Assignee: Guangdong Bravo New Energy Technology Co. LTD., Shunde (CN)

( * ) Notice: Subject to any disclaimer, the term of this patent is extended or adjusted under 35 U.S.C. 154(b) by 0 days.

(21) Appl. No.: 19/194,327

(22) Filed: Apr. 30, 2025

(30) Foreign Application Priority Data

Apr. 11, 2025 (CN) ......................... 202520692871.8

(51) Int. Cl.

| | |
|---|---|
| ***F21L 4/08*** | (2006.01) |
| ***F21V 15/01*** | (2006.01) |
| ***F21V 21/40*** | (2006.01) |
| ***F21V 23/04*** | (2006.01) |
| ***F21V 29/503*** | (2015.01) |
| ***F21V 29/70*** | (2015.01) |
| ***F21V 31/00*** | (2006.01) |
| ***F21Y 103/10*** | (2016.01) |
| ***F21Y 115/10*** | (2016.01) |

(52) U.S. Cl.

CPC ................ *F21L 4/08* (2013.01); *F21V 15/01* (2013.01); *F21V 21/406* (2013.01); *F21V 23/0414* (2013.01); *F21V 29/503* (2015.01); *F21V 29/70* (2015.01); *F21V 31/005* (2013.01); *F21Y 2103/10* (2016.08); *F21Y 2115/10* (2016.08)

(58) Field of Classification Search

CPC .......... F21L 4/08; F21V 15/01; F21V 21/406; F21V 23/0414; F21V 29/503; F21V 31/005; F21Y 2103/10; F21Y 2115/10; F21Y 2107/30; F21Y 2107/40; F21S 9/037

See application file for complete search history.

(56) References Cited

U.S. PATENT DOCUMENTS 5,237,490 A * 8/1993 Ferng ........................ F21V 5/04 362/240
6,685,335 B1 * 2/2004 Yeh ........................... F21L 4/00 362/184
2009/0129069 A1 * 5/2009 Grossman ........... H01M 8/2475 429/8
2012/0320594 A1 * 12/2012 Chien ........................ F21V 3/00 362/249.03
2018/0266657 A1 * 9/2018 Brandt .................. F21V 23/005
2020/0224835 A1 * 7/2020 Grandadam ........... H05K 1/144
2025/0049019 A1 * 2/2025 Li ........................... A01M 1/04

FOREIGN PATENT DOCUMENTS

CN 202048377 U * 11/2011
CN 108826038 A * 11/2018 ............. F21K 9/272
CN 117366494 A * 1/2024 ................ F21L 4/08

* cited by examiner

*Primary Examiner* — Erin Kryukova

(57) ABSTRACT

A solar camping lamp includes a base and a top cover. A battery is provided inside the base. The top cover is arranged above the base and sealed with the base to form a sealed cavity. The solar camping lamp further includes a lighting component. The lighting component is arranged inside the sealed cavity. The lighting component includes at least one light-emitting member, and a lampshade covering an outer side of the light-emitting member. The light-emitting member is electrically connected to the battery.

17 Claims, 12 Drawing Sheets

SOLAR CAMPING LAMP

CROSS-REFERENCE TO RELATED APPLICATIONS

The application claims priority of Chinese patent application CN2025206928718, filed on Apr. 11, 2025, which is incorporated herein by reference in its entireties.

TECHNICAL FIELD

The present invention relates to the field of lighting fixtures, particularly to a solar camping lamp.

BACKGROUND ART

A camping lamp is a movable lighting device that provides illumination and campsite positioning functions for outdoor camping scenes. Early camping lamps mainly relied on dry batteries for power supply, which had limitations such as limited battery capacity and poor portability. With the iteration of technology, modern rechargeable camping lamps are gradually popularized, which can achieve flexible energy replenishment through vehicle charging, direct power charging, and solar charging, significantly improving the convenience of use. However, current commercially available products still generally suffer from problems such as bulky size, narrow lighting range, insufficient brightness, and single functionality, which restrict further improvement of user experience. Therefore, developing camping lamps that combine lightweight design, multifunctional integration, and high portability has become an important direction to meet market demand.

However, although existing solar camping lamps cover light-emitting components with built-in lampshades, their outermost protective capabilities are still insufficient in complex outdoor environments. The lampshades and internal lighting fixtures are exposed to the external environment for a long time, which can cause structural damage due to scratches, collisions, or accidental impacts, leading to accelerated component aging and shortened overall service life.

Based on this, it is necessary to propose a new solar camping lamp that can reduce the failure rate of internal components caused by environmental erosion and extend the service life of the solar camping lamp.

SUMMARY

To overcome the shortcomings of the prior art, the present invention provides a solar camping lamp. The solar camping lamp is capable of reducing the failure rate of internal components caused by environmental erosion, and extending the service life of the solar camping lamp.

A technical solution adopted by the present invention to solve its technical problem is as follows.

The present invention provides a solar camping lamp. The solar camping lamp includes a base and a top cover. A battery is provided inside the base. The top cover is arranged above the base and sealed with the base to form a sealed cavity. The solar camping lamp further includes a lighting component. The lighting component is arranged inside the sealed cavity. The lighting component includes at least one light-emitting member, and a lampshade covering an outer side of the light-emitting member. The light-emitting member is electrically connected to the battery.

As an improvement of the present invention, the base includes an installation seat and a light-transmissible lamp housing installed on the installation seat. The top cover is provided with a first installation slot. One end of the lamp housing is installed in the first installation slot to form the sealed cavity.

As an improvement of the present invention, a second installation slot is defined in the installation seat. An opposite end of the lamp housing is installed in the second installation slot, so that the lamp housing is connected to the installation seat.

As an improvement of the present invention, a first waterproof gasket is provided in the first installation slot. A second waterproof gasket is provided in the second installation slot.

As an improvement of the present invention, two ends of the lamp housing are respectively provided with a first installation plate and a second installation plate. A third installation slot is defined in the first installation plate. A fourth installation slot is defined in the second installation plate. Two ends of the lampshade are respectively installed in the third installation slot and the fourth installation slot.

As an improvement of the present invention, the lighting component further includes a heat sink. The heat sink is electrically connected to the battery. The light-emitting member is installed on an outer surface of the heat sink.

As an improvement of the present invention, the heat sink is provided with a housing body. The housing body is provided with at least one installation engagement slot. Two sides of the light-emitting member are installed in the installation engagement slot.

As an improvement of the present invention, the light-emitting member includes at least one first light strip and at least one second light strip. The first light strip and the second light strip are arranged side by side and surround an outer side wall of the heat sink. The first light strip includes a plurality of first LED light beads. The plurality of first LED light beads are uniformly distributed from top to bottom. The second light strip includes a plurality of second LED light beads. The plurality of second LED light beads are uniformly distributed from top to bottom.

As an improvement of the present invention, the heat sink is a cuboid-shaped heat sink, a cylinder-shaped heat sink or a triangular prism-shaped heat sink.

As an improvement of the present invention, a first through hole is defined in the first installation plate. A second through hole is defined in the second installation plate. A bottom portion of the top cover is provided with an installation channel. The installation seat is provided with a fixed plate. Two ends of the heat sink respectively pass through the first through hole and the second through hole, and respectively extend to the installation channel and the fixed plate to be fixed by fixing members. At least one first fixing hole is defined in a bottom wall of the installation channel. At least one second fixing hole is defined in the fixing plate. Two ends of the heat sink are respectively provided with third fixing holes and fourth fixing holes. The third fixing hole and the fourth fixing hole respectively correspond to the first fixing hole and the second fixing hole. The first fixing hole and the third fixing hole are fixedly connected by the fixing member. The second fixing hole and the fourth fixing hole are fixedly connected by the fixing member. The fixing plate and the bottom wall of the installation channel are further provided with wire threading holes for allowing a wire to pass through.

As an improvement of the present invention, a solar cell module is provided in the top cover. The top cover is provided with an upper cover body and a lower cover body. The lower cover body is detachably connected to the upper cover body. The upper cover body and the lower cover body are sealed to form an installation cavity. The solar cell module is installed in the installation cavity.

As an improvement of the present invention, the solar cell module includes a first installation seat and a second installation seat. The first installation seat and the second installation seat are rotatably connected via a rotating member. The first installation seat is provided with a first solar panel. The second installation seat is provided with a second solar panel. The solar cell module has an unfolded state and a folded state. When the solar cell module is in the unfolded state, the first solar panel and the second solar panel are respectively unfolded on the first installation seat and the second installation seat for charging. When the solar cell module is in the folded state, the first solar panel and the second solar panel are stacked together.

As an improvement of the present invention, the first installation seat is connected to the upper cover body through a first connecting member. The second installation seat is connected to the lower cover body through a second connecting member. The second installation seat is also provided with an engaging portion. An engaging slot is defined in the lower cover body. The engaging portion is installed in the engaging slot. A third waterproof gasket is also provided in the engaging slot.

As an improvement of the present invention, the upper cover body is provided with a first recess. The lower cover body is provided with a second recess. The first recess and the second recess form an avoidance slot for the movement of the rotating member.

As an improvement of the present invention, a locking member is provided on the top cover. The locking member has a locking state and an unlocking state, and the locking member is switchable between the locking state and the unlocking state. When the locking member is in the locking state, the locking member locks the upper cover body and the lower cover body. When the locking member switches from the locking state to the unlocking state, the locking member releases the locking of the upper cover body and the lower cover body.

As an improvement of the present invention, the locking member includes an elastic locking buckle arranged on the lower cover body. The elastic locking buckle is provided with a locking slot. The upper cover body is provided with a locking block. The locking block is provided with an engaging protrusion. The locking block is inserted into the locking slot. The engaging protrusion is engaged with a bottom portion of the locking slot, so that the locking member locks the upper cover body and the lower cover body.

As an improvement of the present invention, the elastic locking buckle includes a pressing portion and a sliding block. The sliding block is integrally formed with the pressing portion. The sliding block is slidably arranged in the first sliding slot of the lower cover body. By pressing or releasing the pressing portion, the sliding block slides in the first sliding slot to disengage or engage the locking block with the locking slot.

As an improvement of the present invention, two sides of the elastic locking buckle are also equipped with elastic restoration arms. By pressing the pressing portion, the elastic restoration arm is capable of sliding and being compressed in the second sliding slot of the lower cover body, so that the locking member is in an unlocking state. By releasing the pressing portion, the elastic restoration arm generates an elastic restoration force to switch the locking member from the unlocking state to a locking state. The lower cover body is also equipped with a position limiting column for restricting the sliding of the elastic restoration arm.

As an improvement of the present invention, the solar camping lamp further includes a handle. The handle is rotatably connected to the top cover.

As an improvement of the present invention, the installation seat is also equipped with a charging port and a switch button. Both the charging port and the switch button are electrically connected to the battery. The charging port is also covered with a waterproof cover. One side of the waterproof cover is hinged to an outer side wall of the installation seat through a hinge portion, and an opposite side of the waterproof cover is provided with a protruding block. A groove is defined in a side wall of the installation seat. The protruding block is arranged inside the groove, so that the waterproof cover tightly covers the charging port. The waterproof cover is also equipped with a guide block for a user to operate and open the waterproof cover.

Beneficial effects of the present invention are as follows. The solar camping lamp includes the base and the top cover. The battery is provided inside the base. The top cover is arranged above the base and sealed with the base to form the sealed cavity. The solar camping lamp further includes the lighting component. The lighting component is arranged inside the sealed cavity. The lighting component includes at least one light-emitting member, and the lampshade covering the outer side of the light-emitting member. The light-emitting member is electrically connected to the battery. The sealing structure of the solar camping lamp can prevent rainwater, dust, moisture and other external impurities from entering the interior, thereby protecting electronic components from corrosion or failure.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
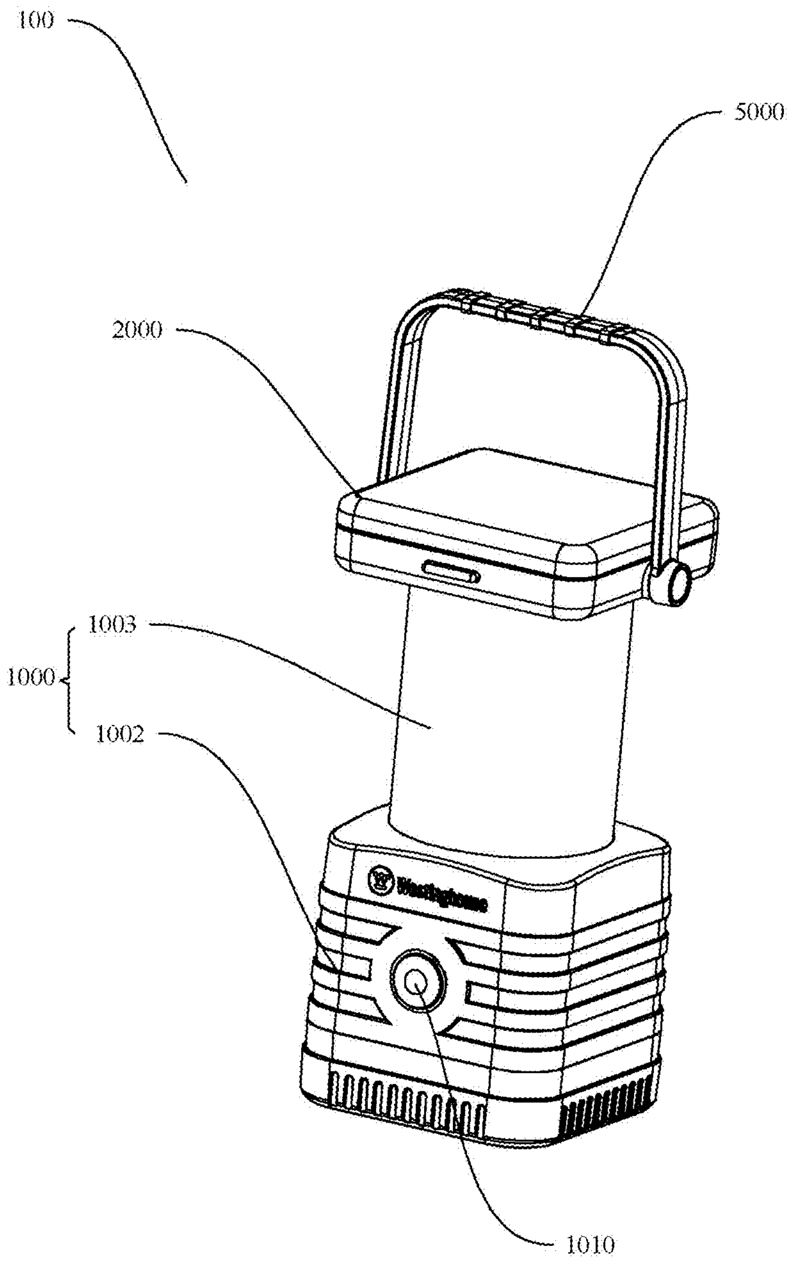
FIG. 1 is a schematic diagram of an overall structure of the present invention.
Figure 2:
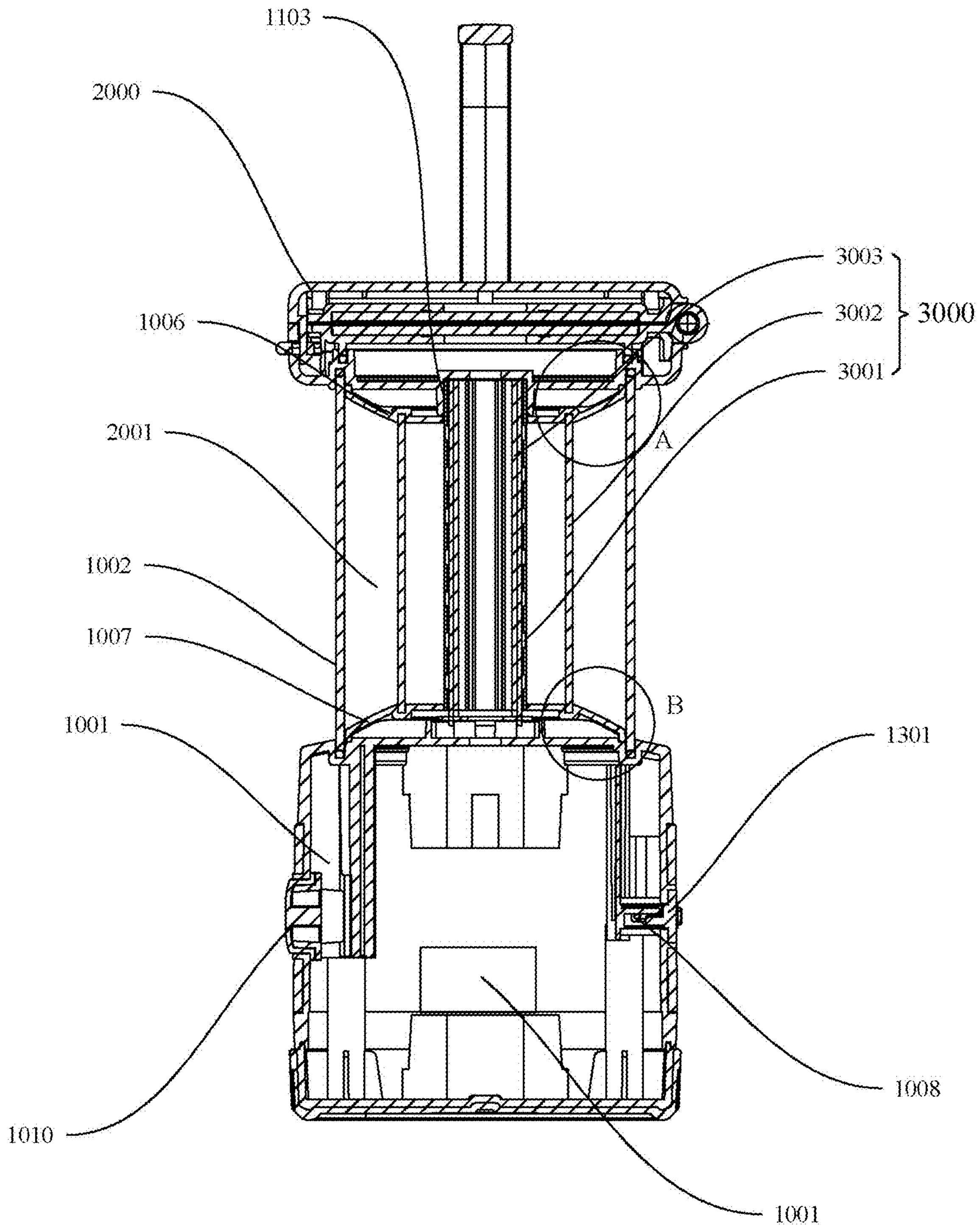
FIG. 2 is a schematic diagram of a cross-sectional structure of the present invention.
Figure 3:
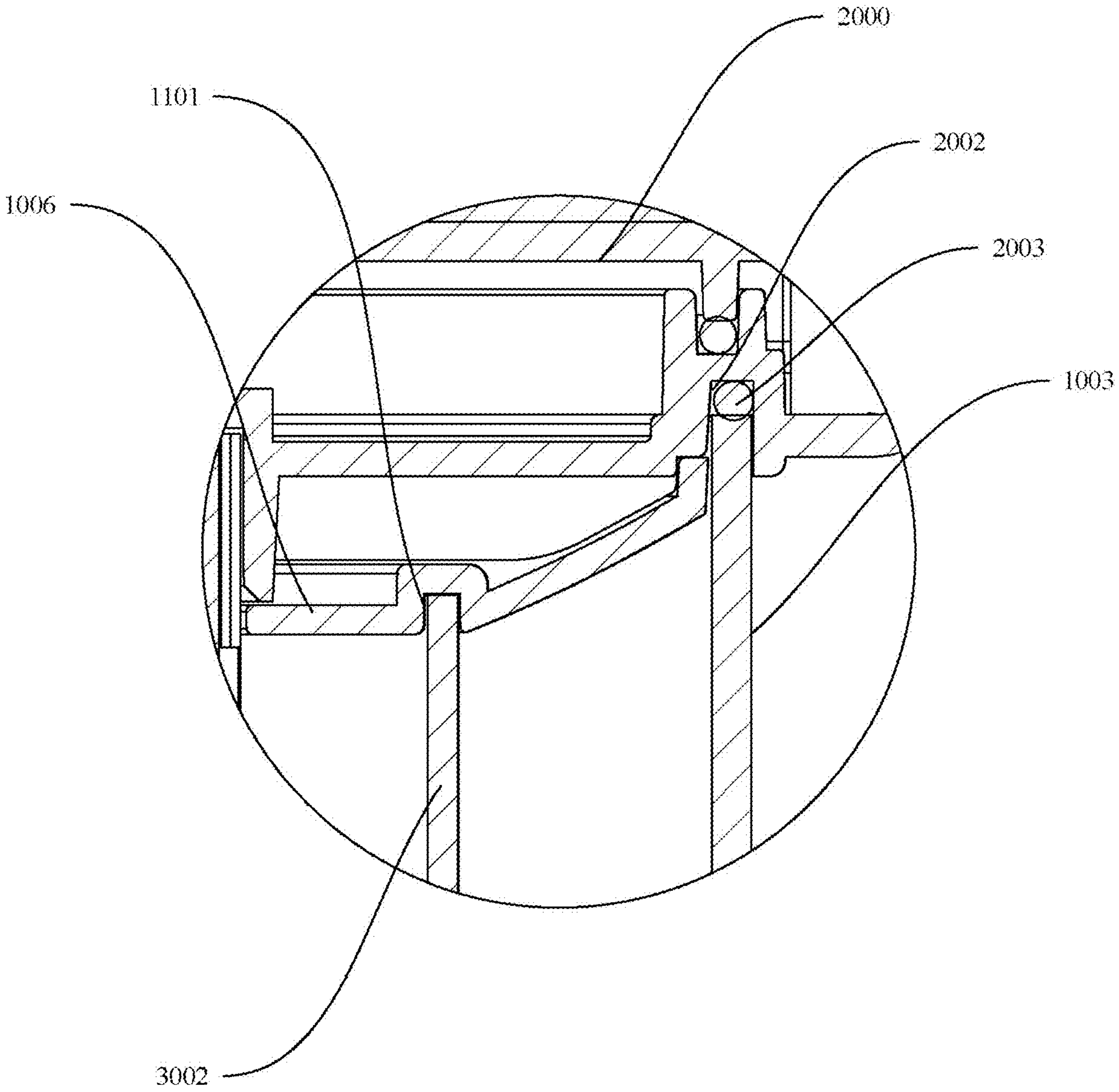
FIG. 3 is a partially enlarged schematic diagram of a structure of area A in FIG. 2.
Figure 4:
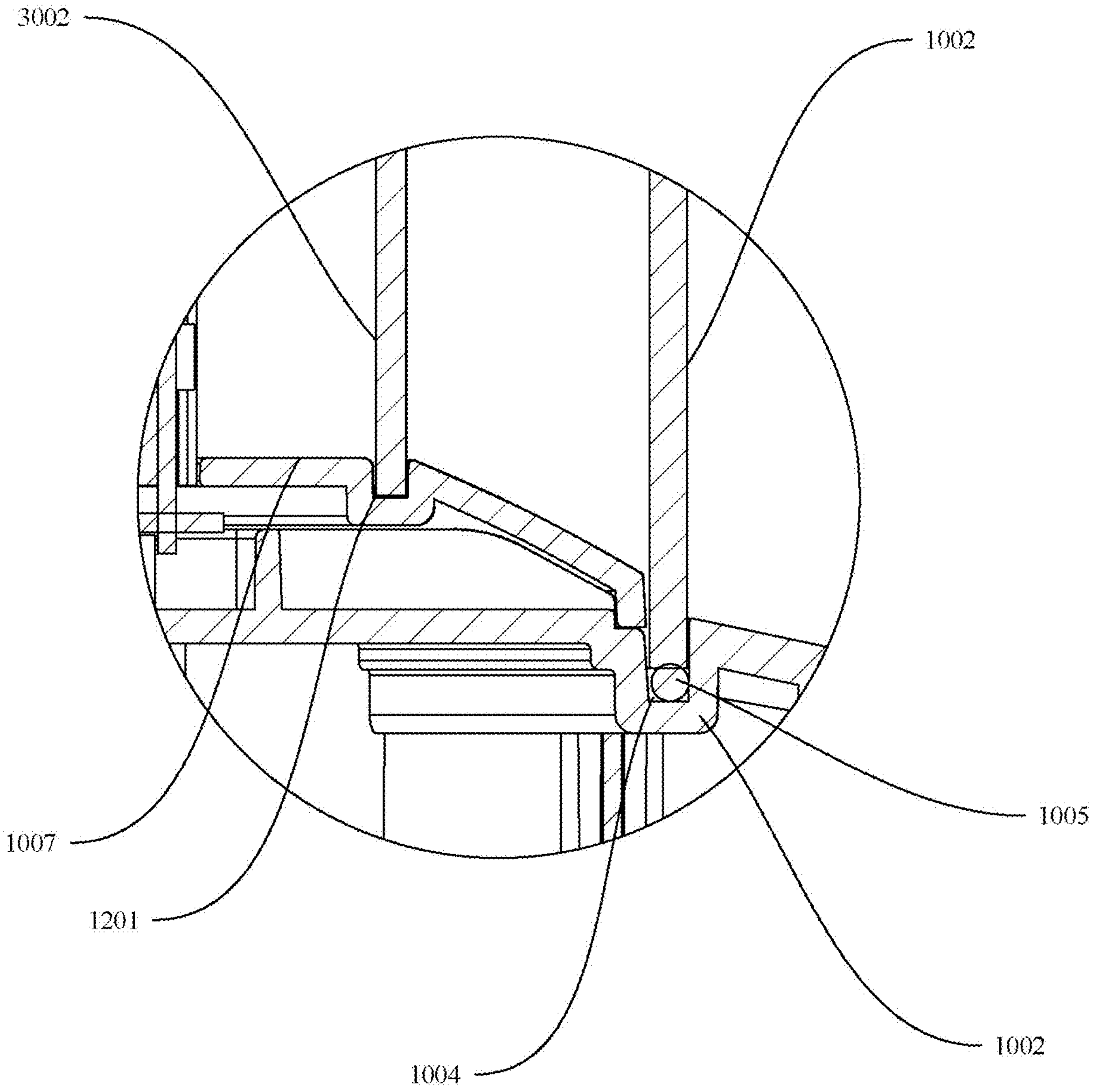
FIG. 4 is a partially enlarged schematic diagram of a structure of area B in FIG. 2.
Figure 5:
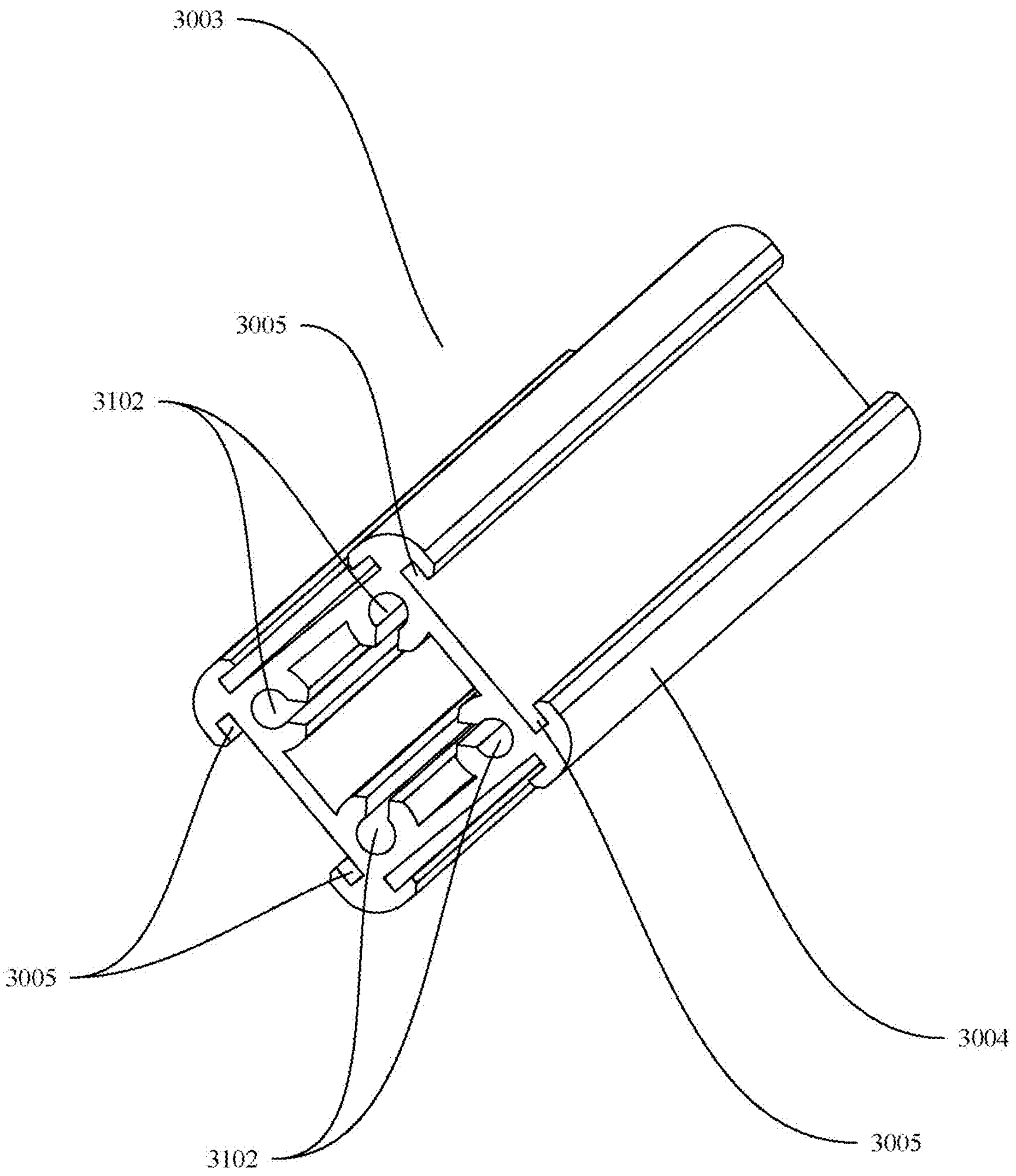
FIG. 5 is a schematic diagram of a structure of a heat sink.
Figure 6:
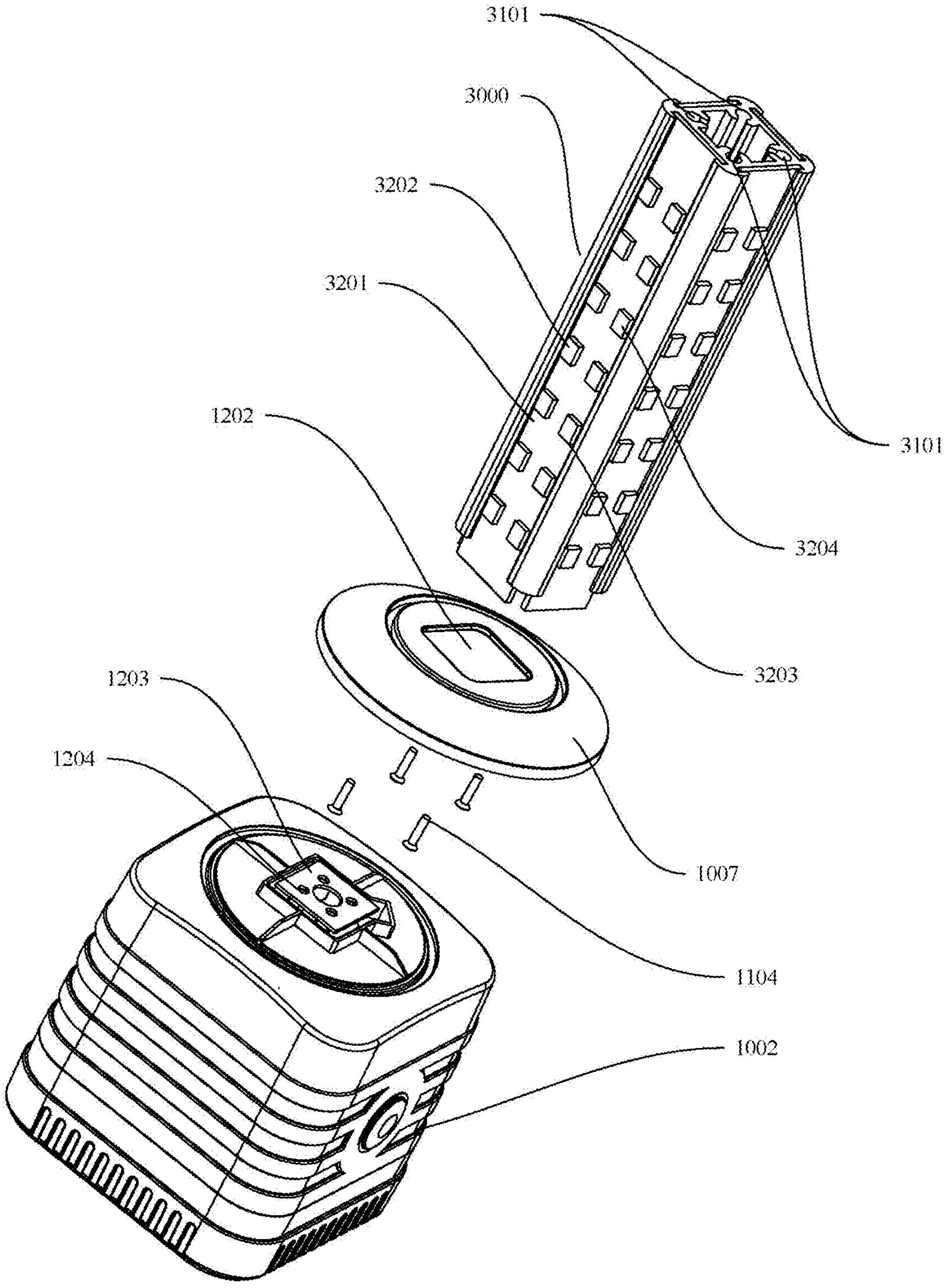
FIG. 6 is a schematic diagram of a connection structure between a heat sink and a base.
Figure 7:
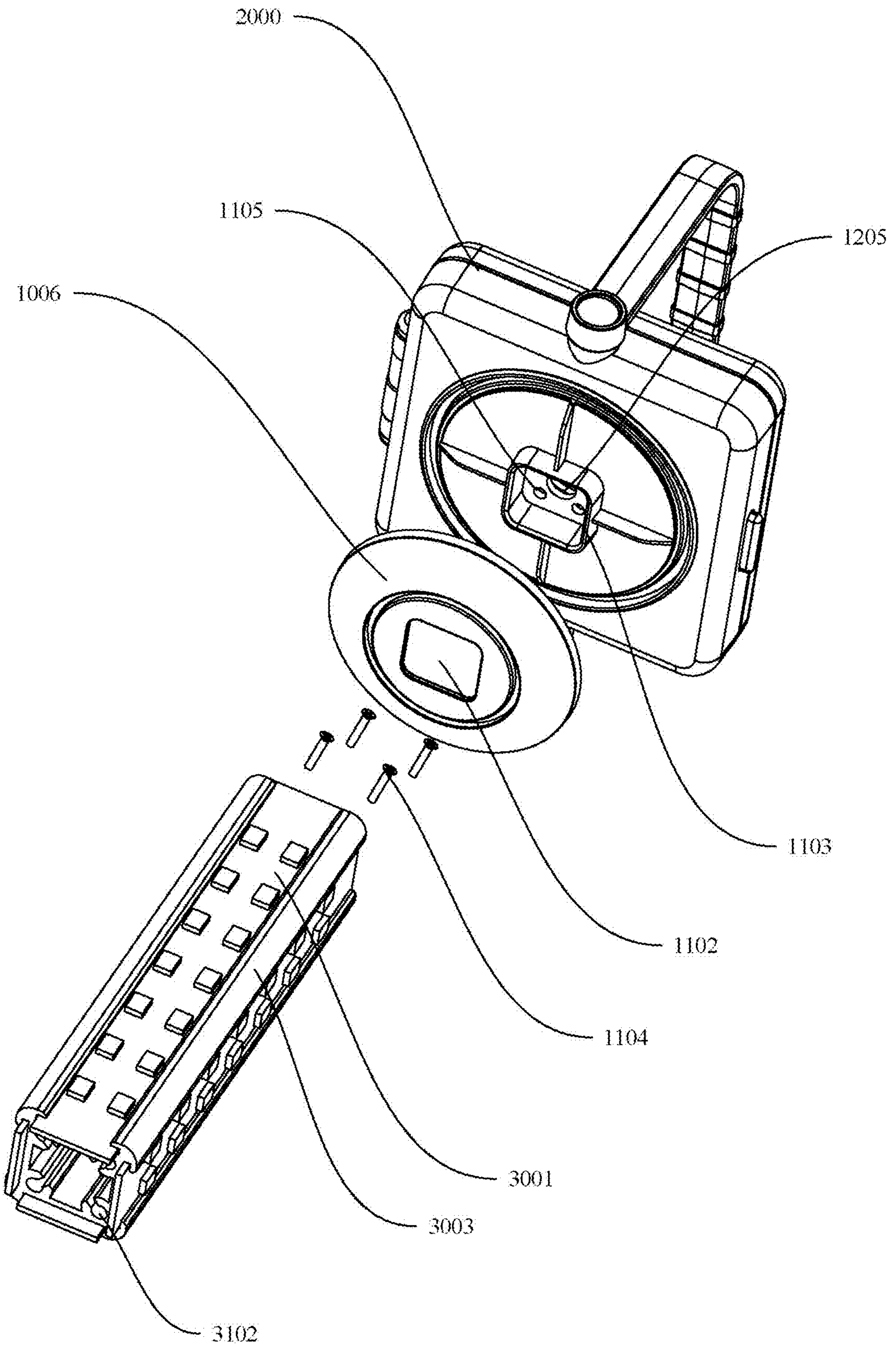
FIG. 7 is a schematic diagram of a connection structure between a heat sink and a top cover.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-12, a solar camping lamp 100 disclosed in the present invention includes a base 1000 and a top cover 2000. A battery 1001 is provided inside the base 1000. The top cover 2000 is arranged above the base 1000 and sealed with the base 1000 to form a sealed cavity 2001. The solar camping lamp 100 further includes a lighting component 3000. The lighting component 3000 is arranged inside the sealed cavity 2001. The lighting component 3000 includes at least one light-emitting member 3001, and a lampshade 3002 covering an outer side of the light-emitting member 3001. The light-emitting member 3001 is electrically connected to the battery 1001. By sealing the top cover 2000 with the base 1000 to form the sealed cavity, the internal battery 1001 and the internal lighting component 3000 are effectively isolated. The above sealing structure can prevent rainwater, dust, moisture, and other external impurities from entering the interior, thereby protecting electronic components from corrosion or malfunction.

In this embodiment, the base 1000 includes an installation seat 1002 and a light-transmissible lamp housing 1003 installed on the installation seat 1002. The top cover 2000 is provided with a first installation slot 2002. One end of the lamp housing 1003 is installed in the first installation slot 2002 to form the sealed cavity 2001. A second installation slot 1004 is defined in the installation seat 1002. An opposite end of the lamp housing 1003 is installed in the second installation slot 1004, so that the lamp housing 1003 is connected to the installation seat 1002. Through the above structure, the two ends of the lamp housing 1003 are respectively fixed in the first installation slot 2002 of the top cover 2000 and the second installation slot 1004 of the installation seat 1002, thereby improving the vibration resistance and impact resistance of a whole component. Moreover, the lamp housing 1003 made of light-transmitting material not only plays a role of protecting an internal structure, but also can efficiently transmit light and evenly distribute the light emitted by the lighting component 3000 to an external environment. This not only maintains the uniformity and softness of a lighting effect, but also avoids the problem of glare caused by direct light irradiation, thereby bringing a user a more comfortable lighting experience.

In this embodiment, a first waterproof gasket 2003 is provided in the first installation slot 2002. A second waterproof gasket 1005 is provided in the second installation slot 1004. By arranging the first waterproof gasket 2003 and the second waterproof gasket 1005, a tight seal is formed between the lamp housing 1003, the installation seat 1002, and the top cover 2000, preventing moisture, dust, and other external pollutants from entering the sealed cavity 2001, thereby protecting the internal battery 1001 and the internal lighting component 3000.

In this embodiment, two ends of the lamp housing 1003 are respectively provided with a first installation plate 1006 and a second installation plate 1007. A third installation slot 1101 is defined in the first installation plate 1006. A fourth installation slot 1201 is defined in the second installation plate 1007. Two ends of the lampshade 3002 are respectively installed in the third installation slot 1101 and the fourth installation slot 1201. By installing the two ends of the lampshade 3002 in the preset third installation slot 1101 and the preset fourth installation slot 1201, a secure connection is achieved between the entire lampshade 3002 and the lamp housing 1003, which can better control the scattering and diffusion effect of light.

In this embodiment, the lighting component 3000 further includes a heat sink 3003. The heat sink 3003 is electrically connected to the battery 1001. The light-emitting member 3001 is installed on an outer surface of the heat sink 3003. The light-emitting member 3001 generates heat during operation, and the heat sink 3003 can quickly dissipate the heat, thereby keeping the light-emitting member 3001 within a lower operating temperature range. This not only improves the brightness stability and continuous working ability of LED and other light-emitting elements, but also effectively extends the service life of a device, avoiding performance degradation or damage caused by too high temperature. In addition, installing the light-emitting member 3001 on a surface of the heat sink 3003 makes the entire lighting component 3000 compact and modular.

In this embodiment, the heat sink 3003 is provided with a housing body 3004. The housing body 3004 is provided with at least one installation engagement slot 3005. Two sides of the light-emitting member 3001 are installed in the installation engagement slot 3005. Through the above structure, the light-emitting member 3001 is always kept in a correct position during operation, which not only effectively prevents element loosening or displacement due to vibration or external impact, but also maintains precise alignment of the lighting component 3000 as a whole, thereby improving the structural stability and reliability of a system.

In this embodiment, the light-emitting member 3001 includes at least one first light strip 3201 and at least one second light strip 3203. The first light strip 3201 and the second light strip 3203 are arranged side by side and surround an outer side wall of the heat sink 3003. The first light strip 3201 includes a plurality of first LED light beads 3202. The plurality of first LED light beads 3202 are uniformly distributed from top to bottom. The second light strip 3203 includes a plurality of second LED light beads 3204. The plurality of second LED light beads 3204 are uniformly distributed from top to bottom. The LED light beads are evenly distributed on the outer side wall of the heat sink 3003 from top to bottom, making the entire lamp emit light uniformly, thereby eliminating the problem of uneven brightness or local light spots being too bright.

In this embodiment, the heat sink 3003 is a cuboid-shaped heat sink. The light-emitting member 3001 is installed on a circumferential side wall of the cuboid-shaped heat sink to provide more uniform light. In other embodiments, the heat sink is a cylinder-shaped heat sink 3003 or a triangular prism-shaped heat sink.

In this embodiment, a first through hole 1102 is defined in the first installation plate 1006. A second through hole 1202 is defined in the second installation plate 1007. A bottom portion of the top cover 2000 is provided with an installation channel 1103. The installation seat 1002 is provided with a fixed plate 1203. Two ends of the heat sink 3003 respectively pass through the first through hole 1102 and the second through hole 1202, and respectively extend to the installation channel 1103 and the fixed plate 1203 to be fixed by fixing members 1104. Through the above structure, the heat sink 3003 is stably connected to the overall structure, thereby preventing displacement or loosening, and ensuring the structural rigidity of the entire device and the stability of long-term use.

In this embodiment, at least one first fixing hole 1105 is defined in a bottom wall of the installation channel 1103. At least one second fixing hole 1204 is defined in the fixing plate 1203. Two ends of the heat sink 3003 are respectively provided with third fixing holes 3101 and fourth fixing holes 3102. The third fixing hole 3101 and the fourth fixing hole 3102 respectively correspond to the first fixing hole 1105 and the second fixing hole 1204. The first fixing hole 1105 and the third fixing hole 3101 are fixedly connected by the fixing member 1104. The second fixing hole 1204 and the fourth fixing hole 3102 are fixedly connected by the fixing member 1104. The fixing plate 1203 and the bottom wall of the installation channel 1103 are further provided with wire threading holes 1205 for allowing a wire to pass through. As a preferred option, the fixing member 1104 is a bolt. By using the bolt for fixed connection, the secure installation of the heat sink 3003 between the top cover 2000 and the installation seat 1002 is ensured.

Figure 8:
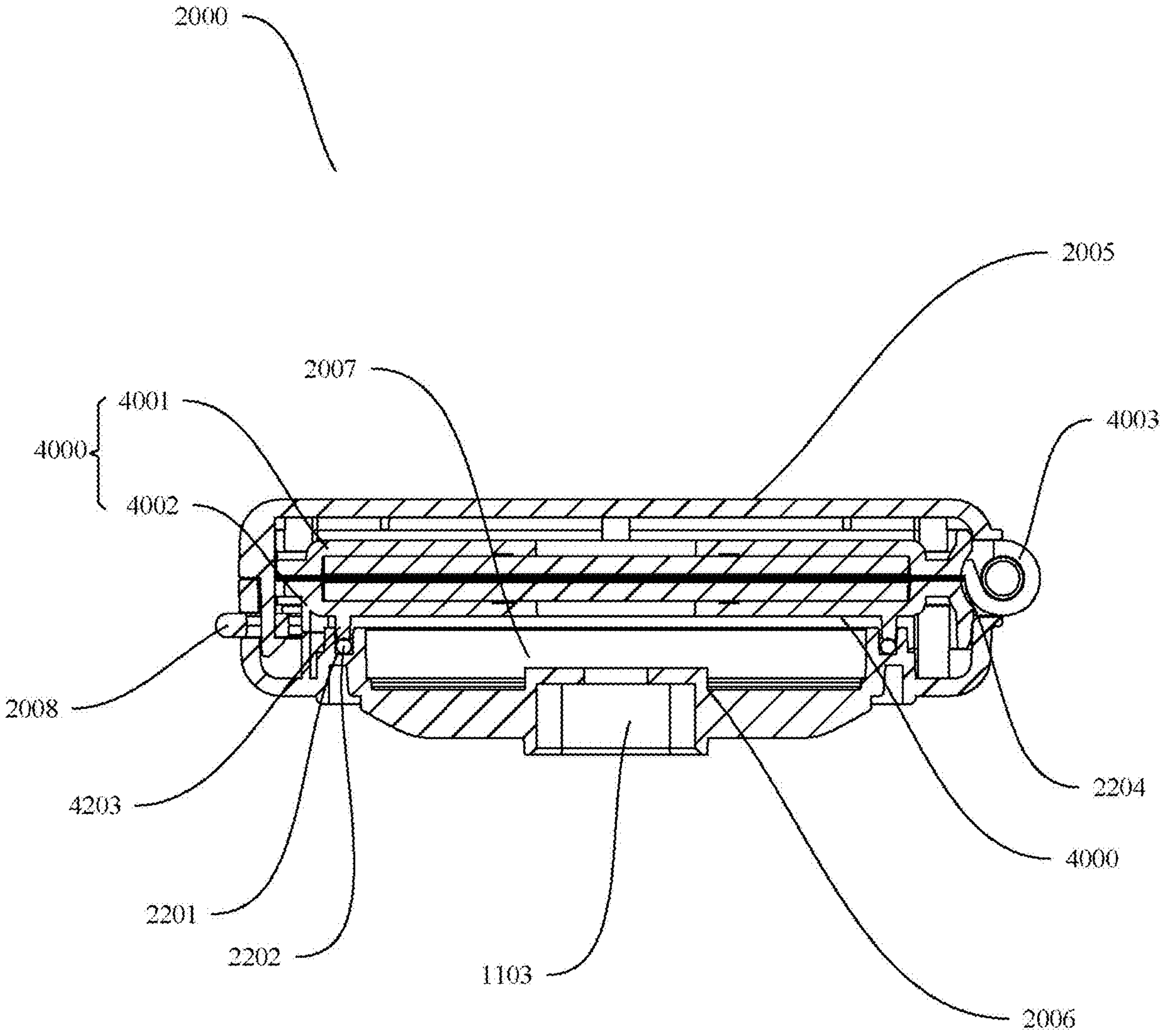
FIG. 8 is a schematic diagram of a cross-sectional structure of a top cover.
Figure 9:
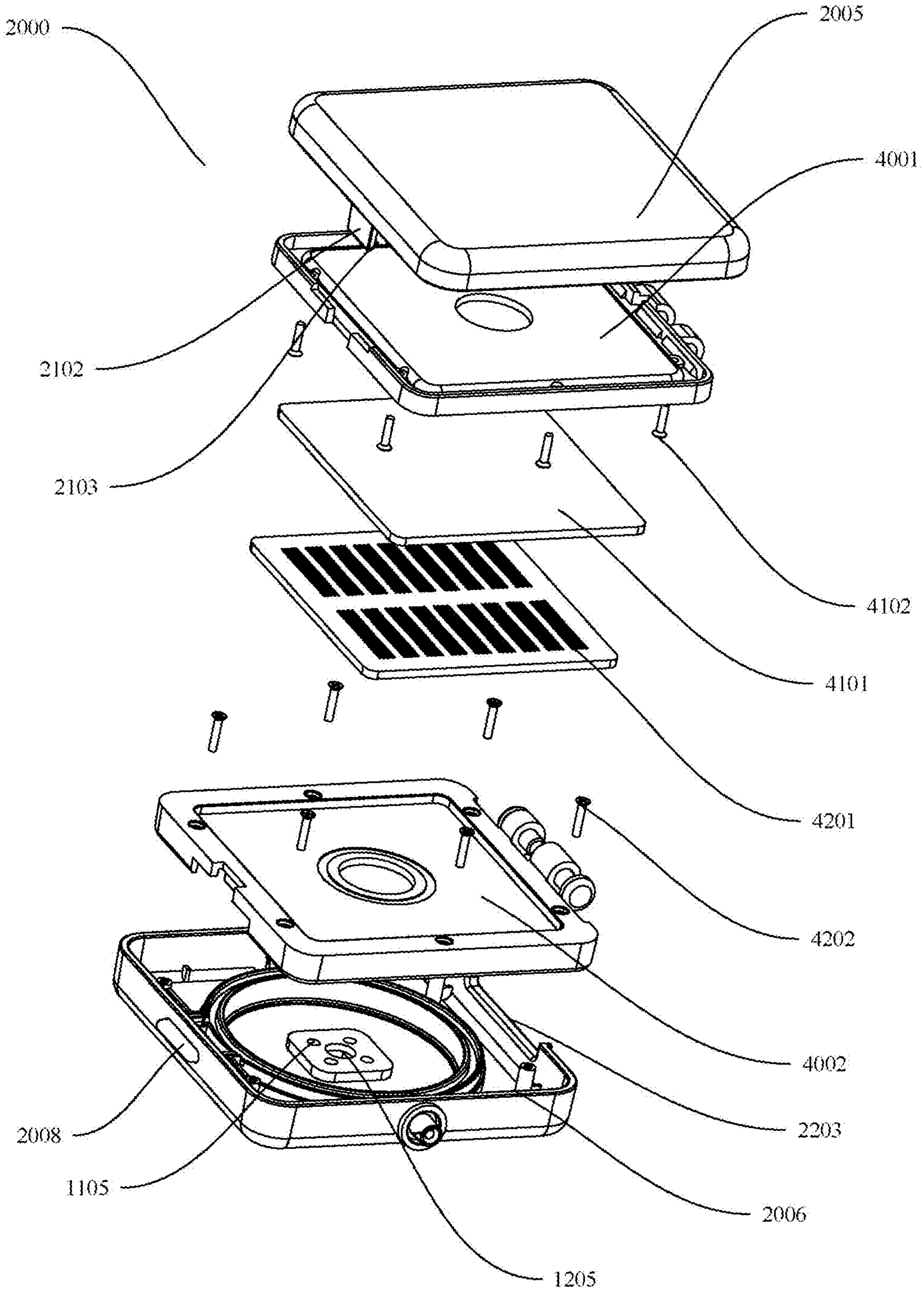
FIG. 9 is a schematic diagram of an exploded structure of a top cover.

In this embodiment, as shown in FIGS. 8-9, a solar cell module 4000 is provided in the top cover 2000. The top cover 2000 is provided with an upper cover body 2005 and a lower cover body 2006. The lower cover body 2006 is detachably connected to the upper cover body 2005. The upper cover body 2005 and the lower cover body 2006 are sealed to form an installation cavity 2007. The solar cell module 4000 is installed in the installation cavity 2007. By arranging the solar cell module 4000, efficient energy collection can be achieved. The sealed installation cavity 2007 is formed between the upper cover body 2005 and the lower cover body 2006, which can effectively isolate external dust, moisture, and other environmental pollutants from invading the solar cell module 4000.

In this embodiment, the solar cell module 4000 includes a first installation seat 4001 and a second installation seat 4002. The first installation seat 4001 and the second installation seat 4002 are rotatably connected via a rotating member 4003. The first installation seat 4001 is provided with a first solar panel 4101. The second installation seat 4002 is provided with a second solar panel 4201. The solar cell module 4000 has an unfolded state and a folded state. When the solar cell module 4000 is in the unfolded state, the first solar panel 4101 and the second solar panel 4201 are respectively unfolded on the first installation seat 4001 and the second installation seat 4002 for charging. When the solar cell module 4000 is in the folded state, the first solar panel 4101 and the second solar panel 4201 are stacked together. The above structure not only facilitates storage and transportation for the user in outdoor camping and other occasions, but also protects the solar cell module 4000 from external impacts and environmental damage.

In this embodiment, the first installation seat 4001 is connected to the upper cover body 2005 through a first connecting member 4102. The second installation seat 4002 is connected to the lower cover body 2006 through a second connecting member 4202. The second installation seat 4002 is also provided with an engaging portion 4203. An engaging slot 2201 is defined in the lower cover body 2006. The engaging portion 4203 is installed in the engaging slot 2201. A third waterproof gasket 2202 is also provided in the engaging slot 2201. Through the above structure, the reliable installation of the solar cell module 4000 inside the top cover 2000 is ensured. Moreover, by arranging the third waterproof gasket 2202, it can effectively prevent external moisture and dust from entering an inner portion of the module, enhancing the waterproof and dustproof performance of the product, and allowing for stable work even in complex and changing outdoor environments.

Figure 10:
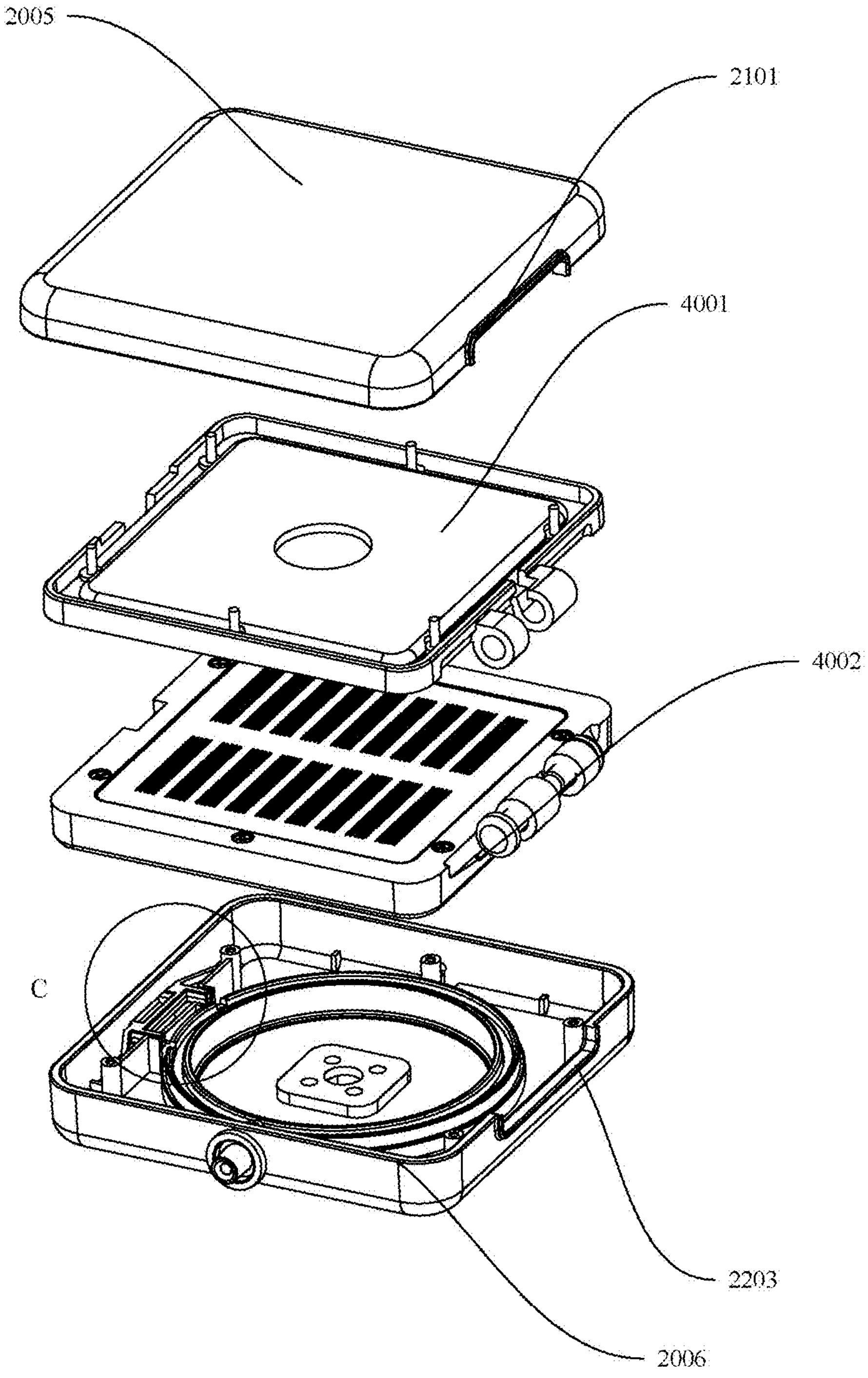
FIG. 10 is a schematic diagram of an exploded structure of a top cover from another angle of view.

In this embodiment, as shown in FIG. 10, the upper cover body 2005 is provided with a first recess 2101. The lower cover body 2006 is provided with a second recess 2203. The first recess 2101 and the second recess 2203 form an avoidance slot 2204 for the movement of the rotating member 4003. The avoidance slot 2204 provides sufficient movement space for the rotating member 4003. During the unfolding or folding process of the solar cell module 4000, the avoidance slot 2204 can effectively avoid interference between the upper cover body 2005 and the lower cover body 2006.

In this embodiment, a locking member 2008 is provided on the top cover 2000. The locking member 2008 has a locking state and an unlocking state, and the locking member 2008 is switchable between the locking state and the unlocking state. When the locking member 2008 is in the locking state, the locking member 2008 locks the upper cover body 2005 and the lower cover body 2006. When the locking member 2008 switches from the locking state to the unlocking state, the locking member 2008 releases the locking of the upper cover body 2005 and the lower cover body 2006. The switchable function of the locking member 2008 allows the user to quickly switch the locking member 2008 to the unlocking state when needed, making it easy to open the top cover 2000 for internal inspection, cleaning, maintenance, or element replacement.

Figure 11:
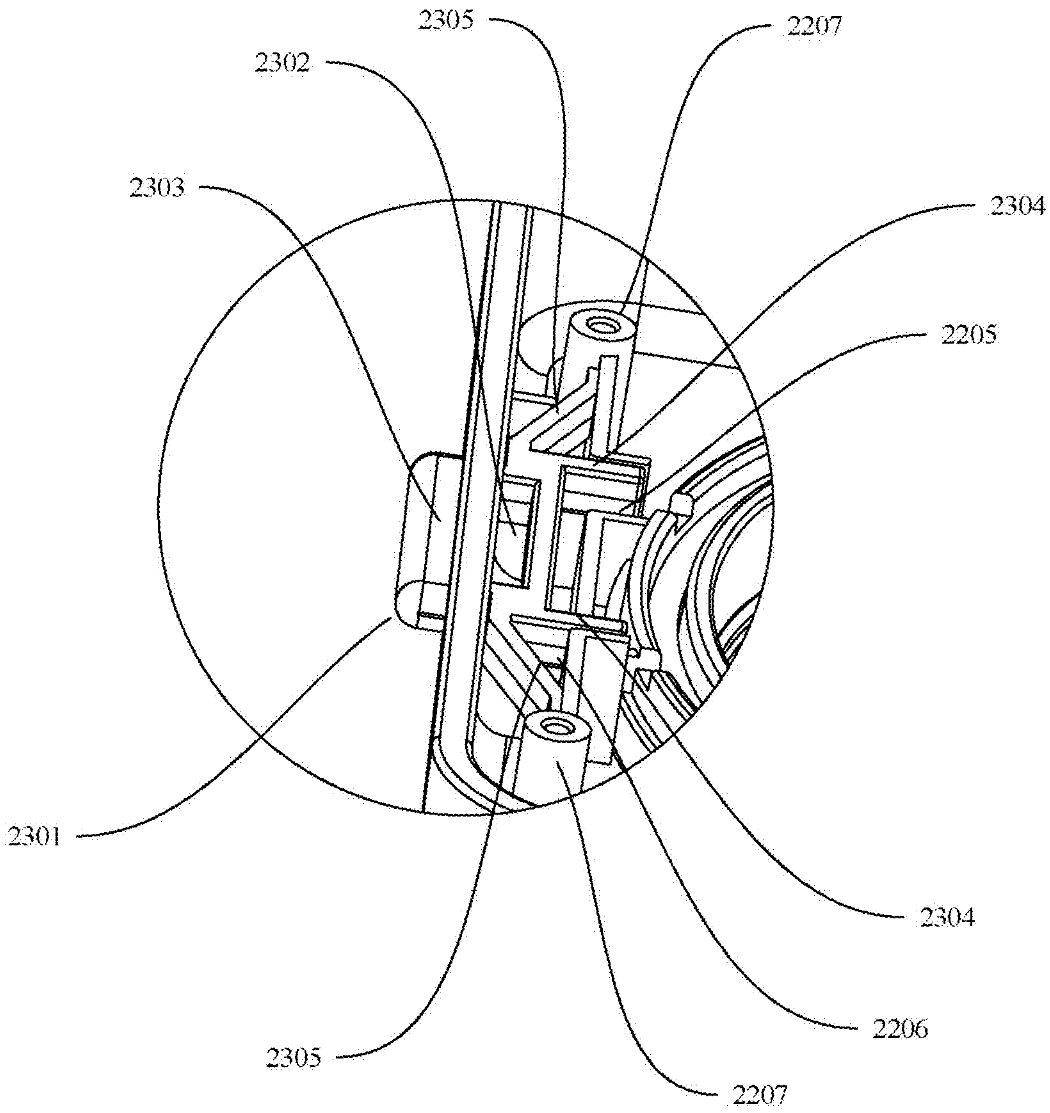
FIG. 11 is a partially enlarged schematic diagram of a structure of area C in FIG. 10.

In this embodiment, as shown in FIG. 11, the locking member 2008 includes an elastic locking buckle 2301 arranged on the lower cover body 2006. The elastic locking buckle 2301 is provided with a locking slot 2302. The upper cover body 2005 is provided with a locking block 2102. The locking block 2102 is provided with an engaging protrusion 2103. The locking block 2102 is inserted into the locking slot 2302. The engaging protrusion 2103 is engaged with a bottom portion of the locking slot 2302, so that the locking member 2008 locks the upper cover body 2005 and the lower cover body 2006. Specifically, the elastic locking buckle 2301 includes a pressing portion 2303 and a sliding block 2304. The sliding block 2304 is integrally formed with the pressing portion 2303. The sliding block 2304 is slidably arranged in the first sliding slot 2205 of the lower cover body 2006. By pressing or releasing the pressing portion 2303, the sliding block 2304 slides in the first sliding slot 2205 to disengage or engage the locking block 2102 with the locking slot 2302. Two sides of the elastic locking buckle 2301 are also equipped with elastic restoration arms 2305. By pressing the pressing portion 2303, the elastic restoration arm 2305 is capable of sliding and being compressed in the second sliding slot 2206 of the lower cover body 2006, so that the locking member 2008 is in the unlocking state. By releasing the pressing portion 2303, the elastic restoration arm 2305 generates an elastic restoration force to switch the locking member 2008 from the unlocking state to the locking state. In addition, the lower cover body 2006 is also equipped with a position limiting column 2207 for restricting the sliding of the elastic restoration arm 2305. Through the above structure, the user can unlock and then open the top cover 2000 by simple operation of pressing, which improves the convenience of using the product.

In this embodiment, the solar camping lamp further includes a handle 5000. The handle 5000 is rotatably connected to the top cover 2000, making it easier and more convenient for the user to carry and move the solar camping lamp.

In this embodiment, the installation seat 1002 is also equipped with a charging port 1008 and a switch button 1010. Both the charging port 1008 and the switch button 1010 are electrically connected to the battery 1001.

As a preferred option, the charging port 1008 is also covered with a waterproof cover 1301. The waterproof cover 1301 effectively prevents rainwater, dust, and other impurities from entering the charging port, ensuring the safety of the internal battery 1001 and circuit.

Figure 12:
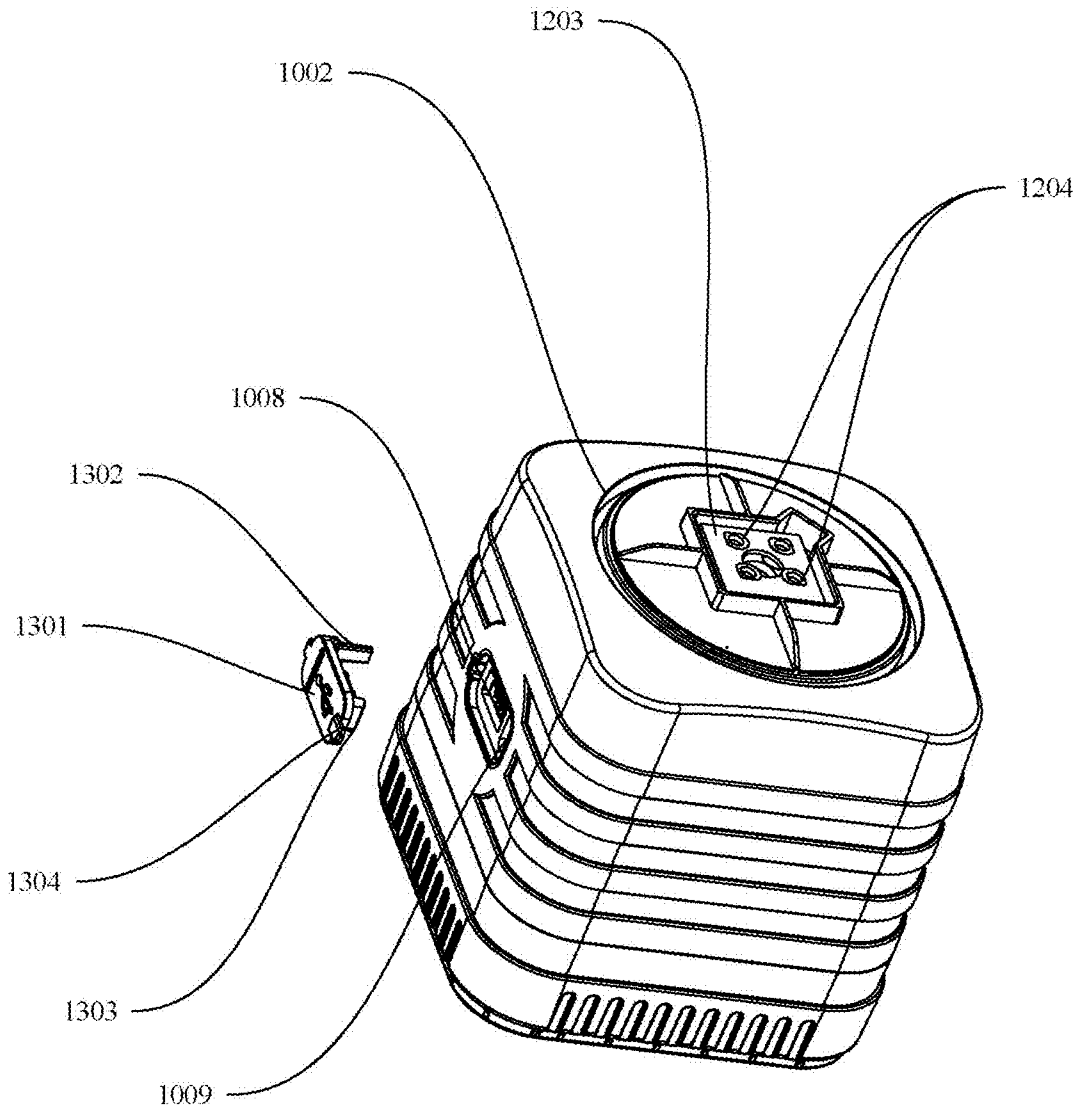
FIG. 12 is a schematic diagram of a structure of a waterproof cover.

Specifically, as shown in FIG. 12, one side of the waterproof cover 1301 is hinged to an outer side wall of the installation seat 1002 through a hinge portion 1302. An opposite side of the waterproof cover 1301 is provided with a protruding block 1303. A groove 1009 is defined in the installation seat 1002. The protruding block 1303 is arranged inside the groove 1009, so that the waterproof cover 1301 tightly covers the charging port 1008, achieving a tight covering of the waterproof cover 1301 on the charging port 1008, thereby further strengthening the sealing effect.

Specifically, the waterproof cover 1301 is also equipped with a guide block 1304 for the user to operate and open the waterproof cover 1301, thereby providing a good grabbing and guiding function for the user during operation, and making the waterproof cover 1301 more convenient to open or close.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A solar camping lamp, comprising:

a base, wherein a battery is provided inside the base;

a top cover, wherein the top cover is arranged above the base and sealed with the base to form a sealed cavity; and a lighting component, wherein the lighting component is arranged inside the sealed cavity, the lighting component comprises at least one light-emitting member, and a lampshade covering an outer side of the light-emitting member, and the light-emitting member is electrically connected to the battery;

wherein a solar cell module is provided in the top cover; the top cover is provided with an upper cover body and a lower cover body; the lower cover body is detachably connected to the upper cover body; the upper cover body and the lower cover body are sealed to form an installation cavity; and the solar cell module is installed in the installation cavity;

wherein the solar cell module comprises a first installation seat and a second installation seat; the first installation seat and the second installation seat are rotatably connected via a rotating member; the first installation seat is provided with a first solar panel; the second installation seat is provided with a second solar panel; the solar cell module has an unfolded state and a folded state; when the solar cell module is in the unfolded state, the first solar panel and the second solar panel are respectively unfolded on the first installation seat and the second installation seat for charging; and when the solar cell module is in the folded state, the first solar panel and the second solar panel are stacked together;

wherein the first installation seat is connected to the upper cover body through a first connecting member; the second installation seat is connected to the lower cover body through a second connecting member; the second installation seat is also provided with an engaging portion; an engaging slot is defined in the lower cover body; the engaging portion is installed in the engaging slot; and a third waterproof gasket is also provided in the engaging slot.

2. The solar camping lamp according to claim 1, wherein the base comprises an installation seat and a light-transmissible lamp housing installed on the installation seat; the top cover is provided with a first installation slot; and one end of the lamp housing is installed in the first installation slot to form the sealed cavity.

3. The solar camping lamp according to claim 2, wherein the installation seat is also equipped with a charging port and a switch button; both the charging port and the switch button are electrically connected to the battery; the charging port is also covered with a waterproof cover; one side of the waterproof cover is hinged to an outer side wall of the installation seat through a hinge portion; an opposite side of the waterproof cover is provided with a protruding block; a groove is defined in a side wall of the installation seat; the protruding block is arranged inside the groove, so that the waterproof cover tightly covers the charging port; and the waterproof cover is also equipped with a guide block for a user to operate and open the waterproof cover.

4. The solar camping lamp according to claim 2, wherein a second installation slot is defined in the installation seat; and an opposite end of the lamp housing is installed in the second installation slot, so that the lamp housing is connected to the installation seat.

5. The solar camping lamp according to claim 4, wherein a first waterproof gasket is provided in the first installation slot; and a second waterproof gasket is provided in the second installation slot.

6. The solar camping lamp according to claim 5, wherein two ends of the lamp housing are respectively provided with a first installation plate and a second installation plate; a third installation slot is defined in the first installation plate; a fourth installation slot is defined in the second installation plate; and two ends of the lampshade are respectively installed in the third installation slot and the fourth installation slot.

7. The solar camping lamp according to claim 1, wherein the lighting component further comprises a heat sink; the heat sink is electrically connected to the battery; and the light-emitting member is installed on an outer surface of the heat sink.

8. The solar camping lamp according to claim 7, wherein the heat sink is provided with a housing body; the housing body is provided with at least one installation engagement slot; and two sides of the light-emitting member are installed in the installation engagement slot.

9. The solar camping lamp according to claim 8, wherein the light-emitting member comprises at least one first light strip and at least one second light strip; the first light strip and the second light strip are arranged side by side and surround an outer side wall of the heat sink; the first light strip comprises a plurality of first LED light beads; the plurality of first LED light beads are uniformly distributed from top to bottom; the second light strip comprises a plurality of second LED light beads; and the plurality of second LED light beads are uniformly distributed from top to bottom.

10. The solar camping lamp according to claim 7, wherein the heat sink is a cuboid-shaped heat sink, a cylinder-shaped heat sink or a triangular prism-shaped heat sink.

11. The solar camping lamp according to claim 1, wherein the upper cover body is provided with a first recess; the lower cover body is provided with a second recess; and the first recess and the second recess form an avoidance slot for the movement of the rotating member.

12. The solar camping lamp according to claim 1, wherein a locking member is provided on the top cover; the locking member has a locking state and an unlocking state; the locking member is switchable between the locking state and the unlocking state; when the locking member is in the locking state, the locking member locks the upper cover body and the lower cover body; and when the locking member switches from the locking state to the unlocking state, the locking member releases the locking of the upper cover body and the lower cover body.

13. The solar camping lamp according to claim 12, wherein the locking member comprises an elastic locking buckle arranged on the lower cover body; the elastic locking buckle is provided with a locking slot; the upper cover body is provided with a locking block; the locking block is provided with an engaging protrusion; the locking block is inserted into the locking slot; and the engaging protrusion is engaged with a bottom portion of the locking slot, so that the locking member locks the upper cover body and the lower cover body.

14. The solar camping lamp according to claim 1, wherein the solar camping lamp further comprises a handle; and the handle is rotatably connected to the top cover.

15. A solar camping lamp, comprising:

a base, wherein a battery is provided inside the base;

a top cover, wherein the top cover is arranged above the base and sealed with the base to form a sealed cavity; and a lighting component, wherein the lighting component is arranged inside the sealed cavity, the lighting component comprises at least one light-emitting member, and a lampshade covering an outer side of the light-emitting member, and the light-emitting member is electrically connected to the battery;

wherein the base comprises an installation seat and a light-transmissible lamp housing installed on the installation seat;

wherein two ends of the lamp housing are respectively provided with a first installation plate and a second installation plate;

wherein the lighting component further comprises a heat sink; the heat sink is electrically connected to the battery; and the light-emitting member is installed on an outer surface of the heat sink;

wherein the heat sink is a cuboid-shaped heat sink, a cylinder-shaped heat sink or a triangular prism-shaped heat sink;

wherein a first through hole is defined in the first installation plate; a second through hole is defined in the second installation plate; a bottom portion of the top cover is provided with an installation channel; the installation seat is provided with a fixed plate; two ends of the heat sink respectively pass through the first through hole and the second through hole, and respectively extend to the installation channel and the fixed plate to be fixed by fixing members; at least one first fixing hole is defined in a bottom wall of the installation channel; at least one second fixing hole is defined in the fixing plate; two ends of the heat sink are respectively provided with third fixing holes and fourth fixing holes; the third fixing hole and the fourth fixing hole respectively correspond to the first fixing hole and the second fixing hole; the first fixing hole and the third fixing hole are fixedly connected by the fixing member; the second fixing hole and the fourth fixing hole are fixedly connected by the fixing member; and the fixing plate and the bottom wall of the installation channel are further provided with wire threading holes for allowing a wire to pass through.

16. A solar camping lamp, comprising:

a base, wherein a battery is provided inside the base;

a top cover, wherein the top cover is arranged above the base and sealed with the base to form a sealed cavity; and a lighting component, wherein the lighting component is arranged inside the sealed cavity, the lighting component comprises at least one light-emitting member, and a lampshade covering an outer side of the light-emitting member, and the light-emitting member is electrically connected to the battery;

wherein a solar cell module is provided in the top cover; the top cover is provided with an upper cover body and a lower cover body; the lower cover body is detachably connected to the upper cover body; the upper cover body and the lower cover body are sealed to form an installation cavity; and the solar cell module is installed in the installation cavity;

wherein a locking member is provided on the top cover; the locking member has a locking state and an unlocking state; the locking member is switchable between the locking state and the unlocking state; when the locking member is in the locking state, the locking member locks the upper cover body and the lower cover body; and when the locking member switches from the locking state to the unlocking state, the locking member releases the locking of the upper cover body and the lower cover body;

wherein the locking member comprises an elastic locking buckle arranged on the lower cover body; the elastic locking buckle is provided with a locking slot; the upper cover body is provided with a locking block; the locking block is provided with an engaging protrusion; the locking block is inserted into the locking slot; and the engaging protrusion is engaged with a bottom portion of the locking slot, so that the locking member locks the upper cover body and the lower cover body;

wherein the lower cover body defines a first sliding slot, the elastic locking buckle comprises a pressing portion and a sliding block; the sliding block is integrally formed with the pressing portion; the sliding block is slidably arranged in the first sliding slot of the lower cover body; by pressing or releasing the pressing portion, the sliding block slides in the first sliding slot to disengage or engage the locking block with the locking slot.

17. The solar camping lamp according to claim 16, wherein the lower cover body further defines a second sliding slot, two sides of the elastic locking buckle are also equipped with elastic restoration arms; by pressing the pressing portion, the elastic restoration arm is capable of sliding and being compressed in the second sliding slot of the lower cover body, so that the locking member is in an unlocking state; by releasing the pressing portion, the elastic restoration arm generates an elastic restoration force to switch the locking member from the unlocking state to a locking state; and the lower cover body is also equipped with a position limiting column for restricting the sliding of the elastic restoration arm.

* * * * *